United States Patent [19]

Trepanier

[11] 3,719,674

[45] March 6, 1973

[54] 1,2-SUBSTITUTED INDENE COMPOUNDS

[75] Inventor: Donald L. Trepanier, Indianapolis, Ind.

[73] Assignee: The Dow Chemical Company, Midland, Mich.

[22] Filed: Feb. 8, 1971

[21] Appl. No.: 113,744

Related U.S. Application Data

[62] Division of Ser. No. 757,102, Sept. 3, 1968, Pat. No. 3,636,116.

[52] U.S. Cl. ........260/244 R, 260/307 D, 260/551 C, 424/248, 424/272, 424/324
[51] Int. Cl. .............................................C07d 87/14
[58] Field of Search............260/244 R, 307 D, 551 C

[56] References Cited

UNITED STATES PATENTS 3,636,116  1/1972  Trepanier..............................260/570
3,277,109  10/1966  Poos et al..............................260/307

Primary Examiner—Henry R. Jiles
Assistant Examiner—G. Thomas Todd
Attorney—John L. Spalding et al.

[57] ABSTRACT

1,2-Substituted indene compounds such as 3-(substituted phenyl)-3a,8b-dihydro-4H-indeno[2,1-d]-isoxazoles are prepared by the reaction of indene with substituted chlorobenzhydroxamic acid. The indenoisoxazole compounds can be converted to other substituted indene compounds by reduction to produce 2-($\alpha$-amino-substituted-benzyl)-1-indanols, which in turn can be reacted with cyanogen bromide to produce substituted $\alpha$-(1-hydroxy-2-indanyl)benzylcyanamides, which can be cyclized to prepare further substituted indene compounds, namely, 2-amino-4-(substituted phenyl)-4,4a,5,9b-tetrahydroindeno[2,1-e]oxazines. The compounds are useful in the study of animal behavior and are particularly useful as potentiators of amphetamine and of barbiturates such as hexobarbital.

10 Claims, No Drawings

1,2-SUBSTITUTED INDENE COMPOUNDS

This application is a divisional of parent application, Ser. No. 757,102, filed Sept. 3, 1968, now U.S. Pat. No. 3,636,116.

BACKGROUND OF THE INVENTION

Description of the Prior Art

The substituted benzhydroxamic acid halides employed as starting materials can be prepared by known methods. A typical method which can be employed is the reaction of a substituted benzaldehyde with hydroxylamine hydrochloride to produce a substituted benzaldoxime. The substituted benzaldoxime is dissolved in chloroform and treated with excess chlorine gas to produce a substituted benzhydroxamic acid chloride.

SUMMARY OF THE INVENTION

This invention is directed to substituted indene compounds and is particularly directed to 1,2-substituted indene compounds corresponding to the formula:

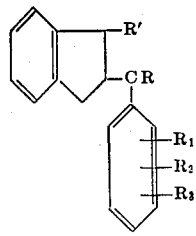

I

In the present specification and claims, $R_1$, $R_2$ and $R_3$ each independently represent hydrogen, chloro, bromo or methyl; R' represents hydroxy; CR represents cyanamidomethylene (=CHNHCN) or an aminomethylene moiety (=CHNH$_2$)·(nHX) of a compound corresponding to formula II

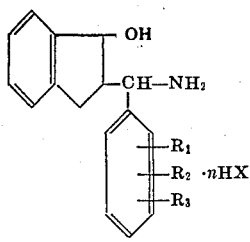

II or CR and R', taken together as CRR', represent an isoxazole residue (=C=NO-) of a compound corresponding to formula III

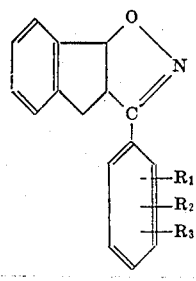

III or a 2-amino-1,3-oxazine residue (=CHN=C(NH$_2$)O—)·(nHX) of a compound corresponding to formula IV

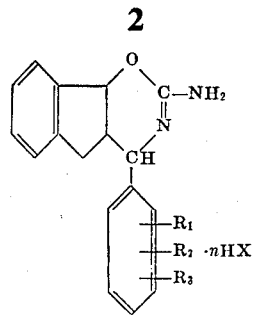

IV n represents one of the integers zero and one and HX represents the acidic moiety of a pharmaceutically acceptable salt. In the present specification and claims, the terms "aminomethylene," "isoxazole residue" and "2-amino-1,3-oxazine residue," when employed with respect to formula I, means and refer to the (=CHNH$_2$)·(nHX), (=C=NO—) and (=CHN=C(NH$_2$)O—)·(nHX) moieties, respectively, of compounds corresponding to formulas II, III and IV, respectively. The term "pharmaceutically acceptable salt," as herein employed, refers to non-toxic salts of the substituted indene compounds. The term includes the salts of the substituted indene compounds with acidic or anionic moieties which have no substantial toxicity or detrimental pharmacological effect when such a salt is administered to animals at dosages consistent with good pharmacological activity. Such pharmaceutically acceptable salts include non-toxic acid addition salts with inorganic acids such as the hydrochloride, hydrobromide, hydroiodide, sulfate, nitrate, bisulfate or phosphate salts, or salts formed with organic acids such as the acetate, propionate, succinate, malate, fumarate, glutamate, salicylate, maleate, tartrate or citrate salts, or salts with organic sulfonic acids such as the camphorsulfonate, methanesulfonate, benzenesulfonate or toluene sulfonate salts. The novel compounds are crystalline solids which are of varying degrees of solubility in organic solvents such as benzene, chloroform, acetone, ether and alcohols and only slightly soluble in water. The pharmaceutically acceptable salts of the substituted indene compounds are moderately soluble in water and alcohols and slightly soluble in organic solvents such as acetone, chloroform, benzene and ether.

For the sake of convenience, the compounds will be referred to herein simply as "substituted indenes." In the naming of individual substituted indenes, it is frequently more convenient to employ nomenclature based on the identity of the CR and R' substituents, rather than naming all the compounds as substituted indenes. Thus, when R' represents hydroxy and CR represents aminomethylene or cyanamidomethylene, the substituted indene compounds will be referred to as "indanols" and "cyanamides," respectively, rather than as dihydrohydroxyindenes or cyanamidomethyldihydroindenes. Similarly, when CRR' represents an isoxazole residue or an oxazine residue, the compounds will be named as "indenoisoxazoles" and "indeno-1,3-oxazines" rather than as isoxazoloindenes or oxazinoindenes.

The novel compounds are useful for administration to animals in the study of the behavior thereof and particularly in studying drug effects on the central and peripheral nervous systems, and are particularly useful as central nervous system active agents, antidepressants and potentiators of amphetamine and of barbiturates. For such uses, the compounds of formula I wherein $n$ is zero and wherein CR is aminomethylene or wherein CRR' is an isoxazole residue or 2-amino-1,3-oxazine residue are preferred. The indanol compounds wherein CR is aminomethylene also have activity as muscle relaxants and are also preferred. Such indanol compounds wherein $R_1$ is chloro or bromo and $R_2$ and $R_3$ are each independently hydrogen, chloro or bromo are particularly potent potentiators of amphetamine and are further preferred. In addition, the indenoisoxazole compounds, the indanols and the cyanamides are all useful as intermediates in the preparation of the indeno-1,3-oxazines of the invention.

The substituted indenes of the invention which correspond to formula I wherein CRR' is an isoxazole residue are prepared by the reaction of a substituted benzhydroxamic acid halide with indene. The compounds wherein R' is hydroxy and CR is aminomethylene are prepared by the reduction of a compound wherein CRR' is an isoxazole residue with lithium aluminum hydride. The compounds of formula I wherein R' is hydroxy and CR is cyanamidomethylene are prepared by the reaction of the compounds wherein CR is aminomethylene with cyanogen bromide. The compounds wherein CRR' is a 2-amino-1,3-oxazine residue are prepared by the cyclization of a compound wherein CR is cyanamidomethylene at elevated temperatures. Representative substituted benzhydroxamic acid halide starting materials include 3-chlorobenzhydroxamic acid chloride, 2-bromo-4-methylbenzhydroxamic acid chloride, 2,4,6-tribromobenzhydroxamic acid chloride, 3,4,5-trimethylbenzhydroxamic acid bromide, 3,4-dichlorobenzhydroxamic acid bromide, 2,6-dimethylbenzhydroxamic acid chloride, 3-chloro-5-bromobenzhydroxamic acid chloride and 2-bromobenzhydroxamic acid bromide.

The reaction of the substituted benzhydroxamic acid halide with indene proceeds with the production of hydrogen halide of reaction when the reactants are mixed together, preferably in an inert organic liquid as a reaction medium and in the presence of a hydrogen halide acceptor. Representative and suitable inert organic liquids which can be employed as reaction media include chloroform, carbon tetrachloride and diethyl ether. Representative and suitable hydrogen halide acceptors include pyridine, lutidine, piperazine, trimethylamine, triethylamine and n-propyl-dimethylamine. The reaction proceeds readily at temperatures from about 0° to about 100°C. and is preferably carried out at the boiling temperature of the reaction mixture under reflux. The proportions of the reactants to be employed are not critical; however, the reaction consumes the reactants and hydrogen halide acceptor in equimolar proportions, and the use of the reactants in such proportions is preferred. The reaction is generally complete in from 0.5 to 3 hours, depending upon the temperature employed. At the end of the reaction period, the reaction mixture is preferably washed with aqueous base such as sodium carbonate. The 3-(substituted phenyl)-3a,8b-dihydro-4H-indeno[2,1-d]isoxazole product can be separated by conventional methods such as evaporation or distillation, and purified by conventional procedures such as recrystallization and washing. The product is obtained as the free base, and it can be administered to animals, or it can be employed to prepare a substituted indene compound wherein R' is hydroxy and CR is aminomethylene.

The compounds wherein R' is hydroxy and CR is aminomethylene are prepared by the reduction of a substituted indene compound of the invention wherein CRR' is an isoxazole residue, that is, an indenoisoxazole, with a reducing agent such as lithium aluminum hydride. The reduction reaction proceeds when the reactants are contacted and mixed, preferably in an inert organic liquid as a reaction medium. Representative inert organic solvents which can be employed as reaction media include tetrahydrofuran and ether. The reaction takes place at temperatures of from 10° to 100°C. and is preferably carried out at the boiling point of the reaction mixture under reflux. The reaction is generally complete in from about 2 hours to 3 days. After the reaction period, the product can be separated by removing any excess reducing agent by the addition of alcohol, water, aqueous tetrahydrofuran, ether and water mixtures or the like and extracting the organic liquid phase with aqueous hydrochloric acid to obtain an aqueous solution of the hydrochloride salt of the product. The acid addition salt product can be separated by evaporation, or it can be neutralized by the addition of aqueous base. In the preferred procedure, the salt is neutralized to obtain the product as the free base indanol by the addition of aqueous alkali metal hydroxide to make the aqueous mixture strongly basic. The product is then separated by conventional procedures such as extraction of the product with an organic liquid such as ether and evaporation or distillation of the organic liquid extract to remove the organic liquid. The 2-($\alpha$-amino-substituted-benzyl)-1-indanol product is conveniently purified by conventional procedures such as recrystallization from organic solvents such as ether, toluene or alcohols. The product can be administered to animals or employed to prepare the cyanamides of the invention.

The substituted indene compounds wherein R' is hydroxy and CR is cyanamido, that is, the cyanamides, are prepared by the reaction of cyanogen bromide with a substituted indanol of formula I wherein R' is hydroxy and CR is aminomethylene. The reaction is carried out in the presence of a weak base such as sodium acetate and with a polar organic liquid such as an alcohol as a reaction medium. The reaction proceeds at temperatures from about 0° to about 40°C. and is preferably carried out at temperatures from about 5° to 30°C. The exact amount of the reagents is not critical, provided that large excesses of cyanogen bromide are avoided. However, the use of substantially equimolar proportions of the cyanogen bromide and the indanol reactants is desirable, the use of a slight excess of cyanogen bromide being preferred. The use of about 2 to 4 moles of sodium acetate for each mole of cyanogen bromide is also preferred.

In a convenient procedure, cyanogen bromide, in methanol solution, is added to a methanol solution of sodium acetate and an appropriate indanol at temperatures of about 5°–15°C. in a well-ventilated hood. The reaction mixture is stirred at ambient temperatures until the reaction has gone to completion. The reaction medium is then removed by distillation or evaporation, for example, and the residue is made basic by the addition of aqueous alkali metal or ammonium hydroxide. The product is separated by such conventional procedures as extraction, preferably with ether, followed by evaporation of the extraction solvent. The substituted α-(1-hydroxy-2-indanyl)benzylcyanamide product can be purified by conventional procedures such as recrystallization or washing, or the product can be converted to an indeno-1,3-oxazine of the invention.

The cyanamide compounds of the invention undergo a cyclization reaction at elevated temperatures to produce the indeno-1,3-oxazine compounds corresponding to formula I wherein CRR' represents a 2-amino-1,3-oxazine residue. The cyclization reaction takes place when the substituted α-(1-hydroxy-2-indanyl)benzylcyanamide compound is heated at a temperature of from about 60° to about 150°C. in a polar organic solvent, preferably in a lower alkanol, as reaction medium and at the boiling point of the reaction mixture under reflux. The reaction is generally complete in from 2 to 12 hours, depending upon the temperature at which the reaction mixture is heated. The product is separated by conventional procedures such as evaporation or distillation to remove the solvents, and can be purified by further conventional methods such as washing and recrystallization. The product is obtained as the free base and it can be administered directly to animals or converted to a pharmaceutically-acceptable salt.

The pharmaceutically-acceptable slats of the substituted indene compounds wherein CR is aminomethylene or a 2-amino-1,3-oxazole residue can be prepared by dissolving the free base in ether and adding an anhydrous acid such as hydrochloric, hydrobromic or hydroiodic acid or an alcohol or ether solution of an acid such as hydrochloric acid, hydrobromic acid, hydroiodic acid, malic acid, citric acid, sulfuric acid, maleic acid or the like until precipitation of the corresponding salt is complete. The salt can be separated by evaporation or by filtration and purified by conventional procedures such as recrystallization or washing. The salt thus purified can be administered to animals or it can be hydrolyzed to prepare the free base.

The substituted indene product can be obtained as the free base by hydrolysis of the pharmaceutically acceptable salts in aqueous base such as aqueous sodium hydroxide solution. The free base compound is then separated by extraction with an organic solvent such as methylene chloride, ether or chloroform, followed by evaporation of the solvent. The product can be purified by conventional methods such as recrystallization, or it can be converted to a different pharmaceutically acceptable salt.

DESCRIPTION OF THE PREFERRED EMBODIMENTS

The following examples illustrate the invention but are not to be construed as limiting the same.

In the examples, the following convention will be employed from time to time to express elemental analysis data in abbreviated from. The elements assayed will be listed, each element being named by a conventional abbreviation, followed by the percentage of each named element found and lastly, by the percentage calculated to be present in the named product. In each list of found or calculated percentage values, the order in which the values are set out corresponds to the order in which the elements were named. For example, in the case of 3-(3,5-dimethyl-4-chlorophenyl)-3a,8b-dihydro-4H-indeno[2,1-d]isoxazole, the expression "C, H, N, O, Cl; found: 72.5, 5.3, 4.8, 5.3, 12.0; calculated: 72.7, 5.4, 4.7, 5.3, 11.9 percent" means that the named compound is found by elemental analysis to have carbon, hydrogen, nitrogen, oxygen and chlorine contents of 72.5, 5.3, 4.8, 5.3 and 12.0 percent, respectively, as compared with the theoretical contents of 72.7, 5.4, 4.7, 5.3 and 11.9 percent, respectively, calculated for the named structure.

EXAMPLE 1

4-Chlorobenzhydroxamic acid chloride (44.5 grams; 0.25 mole) and indene (29 grams; 0.25 mole) are mixed together in 300 milliliters of chloroform. The resulting mixture is stirred while triethylamine (25 grams; 0.25 mole) is added thereto dropwise. The mixture was stirred and heated at the boiling temperature under reflux for 1 hour. The mixture is then cooled, washed with aqueous sodium carbonate solution and dried over anhydrous magnesium sulfate. The dried mixture is evaporated in vacuo to obtain the product as a solid residue. The 3-(4-chlorophenyl)-3a,8b-dihydro-4H-indeno-[2,1-d]isoxazole product is recrystallized from chloroform and found to melt at 183°-184°C. The product is found by elemental analysis to have carbon, hydrogen and nitrogen contents of 71.28, 4.78 and 5.24 percent, respectively, as compared with theoretical values of 71.24, 4.48 and 5.19 percent, respectively, calculated for the named product.

The above procedure is repeated with the sole variations being substitution of different substituted benzhydroxamic acid halides for the 4-chlorobenzhydroxamic chloride employed above to obtain the following:

3-(2,4,5-Trichlorophenyl)-3a,8b-dihydro-4H-indeno [2,1-d]isoxazole, having a molecular weight of 339, is prepared by employing 2,4,5-trichlorobenzhydroxamic acid chloride in lieu of the 4-chlorobenzhydroxamic acid of the above procedure.

3-(3,4-Dibromophenyl)-3a,8b-dihydro-4H-indeno [2,1-d]isoxazole, having a molecular weight of 392, is prepared by employing 3,4-dibromobenzhydroxamic bromide in lieu of the 4-chlorobenzhydroxamic acid chloride in the above procedure.

3-Phenyl-3a,8b-dihydro-4H-indeno[2,1-d]isoxazole, melting at 134°-135°C., is prepared by employing benzhydroxamic acid chloride in lieu of the 4-chlorobenzhydroxamic acid chloride in the above procedure. 3-(4-Methylphenyl)-3a,8b-dihydro-4H-indeno[2,1-d]isoxazole, melting at 127°-128°C., is prepared by employing 4-methylbenzhydroxamic acid chloride in lieu of the 4-chlorobenzhydroxamic acid chloride in the above procedure. C, H, N; found: 81.72, 6.17, 5.71; calculated: 81.90, 6.06, 5.62 percent.

3-(2,4-Dichlorophenyl)-3a,8b-dihydro-4H-indeno [2,1-d]isoxazole, melting at 113°-114°C., is prepared by employing 2,4-dichlorobenzhydroxamic acid chloride in lieu of the 4-chlorobenzhydroxamic acid chloride in the above procedure. C, H, N; found: 63.26, 3.83, 4.78; calculated: 63.18, 3.64, 4.60 percent.

EXAMPLE 2

Lithium aluminum hydride (3.9 grams; 0.1 mole) is suspended in 300 milliliters of diethyl ether and the mixture is heated and stirred at the boiling temperature under reflux in a Soxhlet extraction apparatus while 3-(4-chlorophenyl)-3a,8b-dihydro-4H-idneno[2,1-d]isoxazole (27 grams; 0.1 mole) is added thereto. The mixture is stirred and heated at the boiling temperature under reflux for 18 hours. The mixture is cooled, mixed with 100 milliliters of diethyl ether saturated with water, followed by the dropwise addition of 9 milliliters of water, stirred at ambient temperature for two hours and then filtered. The solid filter cake is washed thoroughly with diethyl ether. The ether washings and filtrate are mixed together and extracted three times with 200 milliliter portions of 1 normal aqueous hydrogen chloride. The combined acid extracts are made basic to a pH of about 10–12 by the addition of aqueous 10 normal sodium hydroxide solution. The mixture is extracted with ether and the ether extract is washed with water, dried over anhydrous magnesium sulfate and evaporated in vacuo to obtain the product as a solid residue. The 2-(α-amino-4-chlorobenzyl)-1-indanol product is recrystallized from isopropanol and found to melt at 112°–113°C. The product is found by elemental analysis to have carbon, hydrogen and nitrogen contents of 70.37, 6.14 and 5.18 percent, respectively, as compared with theoretical values of 70.20, 5.89 and 5.12 percent, respectively, calculated for the named structure.

In substantially the same procedure, the following compounds are prepared by the lithium aluminum hydride reduction of a 3-(substituted phenyl)-3a,8b-dihydro-4H-indeno[2,1-d]isoxazole prepared as described in Example 1.

2-(α-Amino-4-methylbenzyl)-1-indanol, melting at 109°–110°C. C, H, N; found: 80.63, 7.77, 5.42; calculated: 80.60, 7.56. 5.53 percent. Toluene is employed to recrystallize the product.

2-(α-Amino-2,4-dichlorobenzyl)-1-indanol, melting at 103°–104°C. C, H, N; found: 62.25, 4.91, 4.31; calculated: 62.35, 4.90, 4.54 percent. The product is dissolved in ether and the ether solution is treated with ethereal maleic acid until precipitation is complete. The precipitate is separated by filtration and the filter cake is dried to obtain the 2-α-amino-2,4-dichlorobenzyl)-1-indanol maleate salt as a crystalline solid having a molecular weight of 424.

2-(α-Aminobenzyl)-1-indanol, having a molecular weight of 239 is prepared by the above procedure. The product is dissolved in ether and ethereal hydrogen chloride is added to the solution until precipitation of the 2-(α-aminobenzyl)-1-indanol hydrochloride is complete. The mixture is filtered and the filter cake is dried and recrystallized from a mixture of ether and ethanol to obtain the 2-(α-aminobenzyl)-1-indanol hydrochloride product as a crystalline solid melting at 252°–253°C. with decomposition. C, H, N; found: 69.58, 6.65, 5.00; calculated: 69.68, 6.58, 5.08 percent.

EXAMPLE 3

The 2-(αamino-4-chlorobenzyl)-1-indanol of Example 2 (5.5 grams; 0.02 mole) is mixed with sodium acetate (5.4 grams; 0.07 mole) and 70 milliliters of methanol, and the mixture is cooled to a temperature of 5°C. and stirred while a solution of cyanogen bromide (2.3 grams; 0.02 mole) in 30 milliliters of methanol is added dropwise thereto. The mixture is stirred at ambient temperature overnight, mixed with 10 milliliters of aqueous ammonium hydroxide and concentrated in vacuo. The residue is mixed with 500 milliliters of ether and 100 milliliters of water. The ether phase is removed, washed with aqueous hydrogen chloride, dried and evaporated. The residue is triturated with benzene whereupon the product crystallizes. The [4-chloro-α-(1-hydroxy-2-indanyl)benzyl]cyanamide product is recrystallized from benzene and found to melt at 89°–90°C. H, N; found: 5.09, 9.12; calculated: 5.06, 9.38 percent.

In substantially the same procedure and employing similar solvents and indanol starting materials prepared as described in Example 2, the following are prepared:

[4-Methyl-α-(1-hydroxy-2-indanyl)benzyl]-cyanamide, having a molecular weight of 276 is prepared by reacting together equimolar proportions of 2-(α-amino-4-methylbenzyl)-1-indanol and cyanogen in ethanol.

α-(1-Hydroxy-2-indanyl)benzylcyanamide, having a molecular weight of 264, is prepared by reacting 2-(α-aminobenzyl)-1-indanol with cyanogen bromide in the above procedure.

EXAMPLE 4

[4-Chloro-α-(1-hydroxy-2-indanyl)benzyl]cyanamide (3 grams; 0.01 mole) is dissolved in 70 milliliters of methanol and the mixture is heated at the boiling temperature under reflux for 6 hours. The mixture is then concentrated in vacuo and the residue is dissolved in a minimum of hot absolute ethanol. The solution is mixed with 400 milliliters of ether and treated with ethereal hydrogen chloride until the precipitation of the hydrochloride salt product is complete. The product is obtained as a filter cake by suction filtration of the mixture. The 2-amino-4-(4-chlorophenyl)-4,4a,5,9b-tetrahydroindeno[2,1-e]-[1,3]oxazine hydrochloride product is recrystallized from a mixture of isopropanol and ligroin and found to melt at 126°–128°C.

In substantially the same procedure and employing similar substituted α-(1-hydroxy-2-indanyl)benzyl-cyanamide starting materials prepared as described above in Example 3, the following is prepared:

2-Amino-4-(2,4-dichlorophenyl)-4,4a,5,9b-tetrahydroindeno[2,1-e]-[1,3]oxazine hydrobromide, having a molecular weight of 413, is prepared by employing [2,4-dichloro-α-(1-hydroxy-2-indanyl)benzyl]cyanamide as a starting material and substituting hydrogen bromide for hydrogen chloride in the above procedure. The product is dissolved in ether and excess p-toluenesulfonic acid dissolved in a minimal amount of ethanol is added thereto until precipitation is complete. The 2-amino-4-(2,4-dichlorophenyl)-4,4a,5,9b-tetrahydroindeno[2,1-e]-[1,3]oxazine p-toluenesulfonate product, having a molecular weight of 504, is separated by filtration.

EXAMPLE 5

In substantially the same procedure as employed above in Example 4, a solution of α-(1-hydroxy-2-indanyl)-benzylcyanamide (0.01 mole) in 70 milliliters of methanol is heated at the boiling temperature under reflux for 5 hours and concentrated be evaporation in vacuo. The evaporation residue is recrystallized from ethanol and the 2-amino-4-phenyl-4,4a,5,9b-tetrahydroindeno[2,1]-[1,3]oxazine product is found to melt at 144°–145°C. C, H; found: 77.13, 6,33; calculated: 77.25, 6.10 percent.

In substantially the same procedure, 2-amino-4-(4-methylphenyl)-4,4a,5,9b-tetrahydroindeno[2,1-e]-[1,3]oxazine, melting at 150°–151°C., is prepared. H, N; found: 6.8, 9.9; calculated: 6.5, 10.1 percent.

The compounds of the invention can be administered to animals in the study of the behavior thereof and in the study of drug effects on the central and peripheral nervous systems thereof. The compounds are typically administered to animals at dosages from as low as about 1 milligram per kilogram of animal body weight to as high as about 500 milligrams per kilogram of animal body weight, depending upon the particular compound or salt thereof employed and upon such factors as age, species, size and physical condition of the animal, route of administration and the effect to be produced. The compounds are preferably administered as compositions comprising one or more compounds of the invention and one or more pharmaceutical excipients including inert diluents, dispersing agents, binders, wetting agents or the like. They can be administered orally in the from of tablets, elixirs, emulsions or the like, or by injection in the form of sterile injectable solutions or suspensions.

The compounds have central nervous system activity as indicated by their effectiveness in increasing hexobarbital sleep time in mice. In representative operations, separate groups of mice are administered one of the compounds by intraperitoneal injection. One hour later, hexobarbital is administered by intraperitoneal injection at a dosage rate of 100 milligrams per kilogram. Separate groups of untreated mice are similarly injected with hexobarbital at a dosage rate of 100 milligrams per kilogram to serve as checks. The hexobarbital injections induce sleep in the mice. All the animals are then placed on their backs and the period of time until each mouse turns over and rights itself is recorded as sleep time. In representative operations, mice administered one of 3-phenyl-3a,8b-dihydro-4H-indeno[2,1-d]isoxazole, 2-amino-4-methylphenyl-4,4a,5,9b-tetrahydroindeno[2,1-e]-[1,3]oxazine or 2-(α-amino-2,4-dichlorobenzyl)-1-indanol at dosage rates of 500, 204 and 65 milligrams per kilogram, respectively, are found to sleep more than twice as long as the untreated check mice.

In other operations, mice are protected from seizures induced by electroshock when administered 2-(α-amino-4-chlorobenzyl)-1-indanol by intraperitoneal injection. In such operations, the named compound is found to have ED 50 of 34 milligrams per kilogram.

In further operations, representative compounds of the invention are found to potentiate the symptoms of hyperexcitment, hyperirritability and fighting induced in mice by the intraperitoneal administration of amphetamine. In such operations, separate groups of mice are administered a test compound by intraperitoneal injection at various dosage rates. Thirty minutes later, the mice are administered 5 milligrams per kilogram of d-amphetamine sulfate by intraperitoneal injection. Each group of mice is then placed in a small cage. The intraperitoneal injection of 20 milligrams per kilogram of amphetamine to mice, followed by aggregation of the mice in small cages results in hyperexcitement, fighting and death of all the mice within about 5 hours. The administration of 5 milligrams of amphetamine per kilogram is not generally fatal to any of the mice under identical test conditions. The dosage of a test compound required to produce death in 50 percent of the amphetamine-treated mice (ED 50) is calculated. In such operations, 3-(4-methylphenyl)-3a,8b-dihydro-4H-indeno[2,1-d]isoxazole, 2-(α-amino-4-chlorobenzyl)-1-indanol and 2-amino-4-phenyl-4,4a,5,9b-tetrahydroindeno[2,1-e]-[1,3]oxazine are found to potentiate such effects of amphetamine with ED 50's of 148, 7.7 and 8.1 milligrams per kilogram, respectively.

What is claimed is:
1. A compound corresponding to the formula

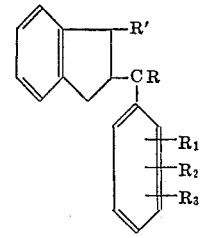

wherein $R_1$, $R_2$ and $R_3$ each independently represent hydrogen, chloro, bromo or methyl; $R'$ represents hydroxy; CR represents cyanamidomethylene or CR and $R'$, taken together as $CRR'$, represent an isoxazole residue corresponding to the formula

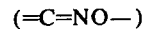

$$(=C=NO-)$$

or a 2-amino-1,3-oxazine residue corresponding to the formula

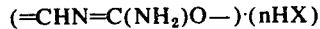

$$(=CHN=C(NH_2)O-) \cdot (nHX)$$

and in which $n$ represents one of the integers zero and one and HX represents the acidic moiety of a pharmaceutically acceptable salt.

2. A compound of claim 1 wherein $n$ is zero.
3. A compound of claim 1 wherein $CRR'$ represents an isoxazole residue.
4. A compound of claim 1 wherein $CRR'$ represents a 2-amino-1,3-oxazine residue.
5. A compound of claim 1 which is [4-methyl-α-(1-hydroxy-2-indanyl)benzyl]cyanamide.
6. A compound of claim 1 which is α-(1-hydroxy-2-indanyl)benzylcyanamide.
7. A compound of claim 3 which is 3-phenyl-3a,8b-dihydro-4H-indeno[2,1-d]isoxazole.
8. A compound of claim 3 which is 3-(4-methylphenyl)-3a,8b-dihydro-4H-indeno[2,1-d]isoxazole.
9. A compound of claim 4 which is 2-amino-4-phenyl-4,4a,5,9b-tetrahydroindeno[2,1-e]-[1,3]oxazine.
10. A compound of claim 4 which is 2-amino-4-(4-methylphenyl)-4,4a,5,9b-tetrahydroindeno[2,1-c]-[1,3]oxazine.

* * * * *